United States Patent [19]

Erlandsson

[11] Patent Number: 4,938,647
[45] Date of Patent: Jul. 3, 1990

[54] TRUCK ACTUATED VEHICLE RESTRAINT HAVING A PIVOTABLE SLIDE

[75] Inventor: Kjell I. Erlandsson, Milwaukee, Wis.

[73] Assignee: Kelley Company Inc., Milwaukee, Wis.

[21] Appl. No.: 410,584

[22] Filed: Sep. 21, 1989

[51] Int. Cl.⁵ .............................................. B65G 67/02
[52] U.S. Cl. ................................... 414/401; 414/584; 14/71.1
[58] Field of Search ...................... 414/396, 401, 584; 14/71.1

[56] References Cited

U.S. PATENT DOCUMENTS

| | | |
|---|---|---|
| 2,693,284 | 11/1954 | Gerhardt. |
| 4,127,857 | 11/1878 | Bickel .................................. 340/687 |
| 4,148,498 | 4/1979 | Taylor, Jr. .......................... 280/482 |
| 4,208,161 | 1/1980 | Hipp et al. ......................... 414/401 |
| 4,264,259 | 4/1981 | Hipp ................................... 414/401 |
| 4,267,748 | 5/1981 | Gruenewald et al. ................ 74/529 |
| 4,282,621 | 8/1981 | Anthony et al. ..................... 14/71.1 |
| 4,373,847 | 2/1983 | Hipp et al. ......................... 414/401 |
| 4,400,127 | 8/1983 | Metz .................................. 414/401 |
| 4,443,150 | 4/1984 | Hahn et al. ......................... 414/401 |
| 4,472,099 | 9/1984 | Hahn et al. ......................... 414/401 |
| 4,488,325 | 12/1984 | Bennett et al. ....................... 14/71.3 |
| 4,555,211 | 11/1985 | Metz .................................. 414/401 |
| 4,560,315 | 12/1985 | Hahn .................................. 414/401 |
| 4,589,813 | 5/1986 | Hagen et al. ........................ 414/401 |
| 4,605,353 | 8/1986 | Hahn et al. ......................... 414/401 |
| 4,630,989 | 12/1986 | Davey ................................ 414/401 |
| 4,634,334 | 1/1987 | Hahn et al. ......................... 414/401 |
| 4,695,216 | 9/1987 | Erlandsson ......................... 414/401 |
| 4,728,242 | 3/1988 | Erlandsson ......................... 414/401 |
| 4,759,678 | 7/1988 | Hageman ........................... 414/401 |
| 4,767,254 | 8/1988 | Kovach et al. ...................... 414/401 |
| 4,784,567 | 11/1988 | Hageman et al. ................... 414/401 |
| 4,815,918 | 3/1989 | Bennett et al. ..................... 414/401 |
| 4,830,563 | 5/1989 | Yeakle ............................... 414/401 |

Primary Examiner—Robert J. Spar
Assistant Examiner—Keith L. Dixon
Attorney, Agent, or Firm—Andrus, Sceales, Starke & Sawall

[57] ABSTRACT

A vehicle restraint for preventing a vehicle, such as a truck, from accidentally pulling away from a loading dock during a loading operation. The vehicle restraint comprises a mounting plate mounted on the front vehicle face of the loading dock and a slide is mounted for movement on the mounting plate and is biased to an upper position. The slide has an inner end pivotally connected to the mounting plate and has an upper surface formed with a notch or recess. The outer surface of the slide slopes downwardly and outwardly at an angle to the horizontal. When a truck backs toward the loading dock, an abutment, such as an ICC bar at the rear end of the truck, will engage the inclined outer surface and wedge the slide downwardly against the force of the biasing member, and the ICC bar will then engage the notch located in the upper surface of the slide. The downward wedging action will pivot the slide upwardly about the mounting frame to progressively decrease the angle of the outer surface with relation to the horizontal. To release engagement of the ICC bar from the notch, a release bar is moved upwardly into engagement with the ICC bar, thereby driving the slide downwardly against the force of the biasing member to release the ICC bar and enable the truck to pull away from the dock.

14 Claims, 2 Drawing Sheets

TRUCK ACTUATED VEHICLE RESTRAINT HAVING A PIVOTABLE SLIDE

BACKGROUND OF THE INVENTION

Vehicle restraints are employed to lock a truck or other vehicle to a loading dock to prevent the truck from accidentally pulling away from the dock during a loading operation.

U.S. Pat. No. 4,695,216 describes a vehicle restraint having a mounting plate which is mounted on the front vertical surface of the dock and a slide is mounted for sliding movement on the mounting plate. To guide the slide in movement, the slide carries two sets of vertically spaced rollers which ride on guide tracks on the dock face. The forward end of the slide is inclined, sloping downwardly and outwardly from the dock and the slide is biased to an upper position.

With the vehicle restraint of U.S. Pat. No. 4,695,216, an ICC bar of a truck backing toward the dock will engage the inclined surface of the slide, wedging or camming the slide down against the biasing means and the ICC bar will then engage a recess or notch formed in the upper surface of the slide. Engagement of the ICC bar with the notch will prevent the truck from pulling away from the dock during the loading operation.

In the construction of U.S. Pat. No. 4,695,216 the ICC bar is released from the notch through use of a release bar that is mounted for movement relative to the slide. The release bar is moved upwardly against the ICC bar, thereby resulting in a downward force being applied to the slide which will move the slide downwardly against the force of the biasing means to release the ICC bar from engagement with the notch, thus enabling the truck to pull away from the dock.

The vehicle restraint of U.S. Pat. No. 4,695,216 also can incorporate an extension leg which is pivotally connected to the slide and forms an extension to the inclined surface of the slide. The extension leg is prevented from pivoting downwardly relative to the slide but can freely pivot upward. If a truck having a low ICC bar backs toward the dock, the ICC bar will initially engage the extension leg wedging the slide downwardly and the ICC bar will then ride upwardly along the inclined surface of the slide. As the ICC bar rides against the inclined slide, the extension leg will be pivoted upwardly through the connection of a fixed link to the frame, thereby enabling the slide to continue to move downwardly until the ICC bar engages the notch in the upper edge of the slide. The use of the extension leg increases the operating range of the vehicle restraint for a slide of given vertical dimension.

SUMMARY OF THE INVENTION

The invention is directed to a vehicle restraint, and more particularly to a restraint which is an improvement to that described in U.S. Pat. No. 4,695,216.

In accordance with the invention, the vehicle restraint includes a mounting plate mounted on the front face of the loading dock and a slide or carriage is mounted for vertical movement on the mounting plate and is biased to an upper position.

The inner end of the slide carries a pair of rollers which are mounted on a horizontal axis and the rollers permit the slide to be moved vertically on the mounting plate, as well as enabling the slide to pivot around the horizontal axis.

The upper surface of the slide is formed with a notch, while the outer surface of the slide extends downwardly and outwardly to a location substantially beneath the horizontal axis of the rollers. A link of fixed length pivotally interconnects the lower end of the outer surface of the slide and the lower end of the mounting frame.

When a truck backs toward the loading dock, the ICC bar will engage the outer inclined surface of the slide, wedging the slide downwardly against the force of the biasing means and simultaneously causing the slide to pivot about the axis of the rollers to progressively change the angle of the inclined outer surface relative to the horizontal.

Continued inward movement of the truck toward the loading dock will wedge the slide downwardly to a point where the ICC bar rides over the upper tip of the slide and onto the upper surface of a release bar. The release bar is then lowered, and as the release bar is lowered, the biasing means will urge the slide upwardly to move a recess or notch in the upper surface of the slide into engagement with the ICC bar. The generally vertical edge bordering the recess will prevent the truck from pulling away from the dock during the loading operation.

After the loading operation has been completed, the ICC bar can be removed from the notch through operation of the release bar which is moved upwardly into contact with the ICC bar, thus driving the slide downwardly against the force of the biasing means to release the ICC bar from the notch and enable the truck to pull away from the dock.

The vehicle restraint of the invention is lightweight and of simple construction. Only a single set of guide rollers is required, thus eliminating any possibility of jamming of the slide as can occur when multiple sets of guide rollers are required. Further, the use of a single set of guide rollers reduces the vertical depth of the slide, thereby enabling the slide to move to a lower position and increasing the range of operability of the vehicle restraint.

As a further advantage, the angularity of the outer surface of the slide is progressively decreased relative to the horizontal as the ICC bar engages the outer surface and moves toward the loading dock. As the angularity decreases, the force on the cam member required to drive the slide down correspondingly decreases and this reduces the stress applied to the slide and the supporting guide rollers. In addition, a portion of the force applied to the slide through the ICC bar is carried by the arms or links that connect the lower end of the inclined outer surface with the frame and this further reduces the stress on the guide rollers and bearings.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
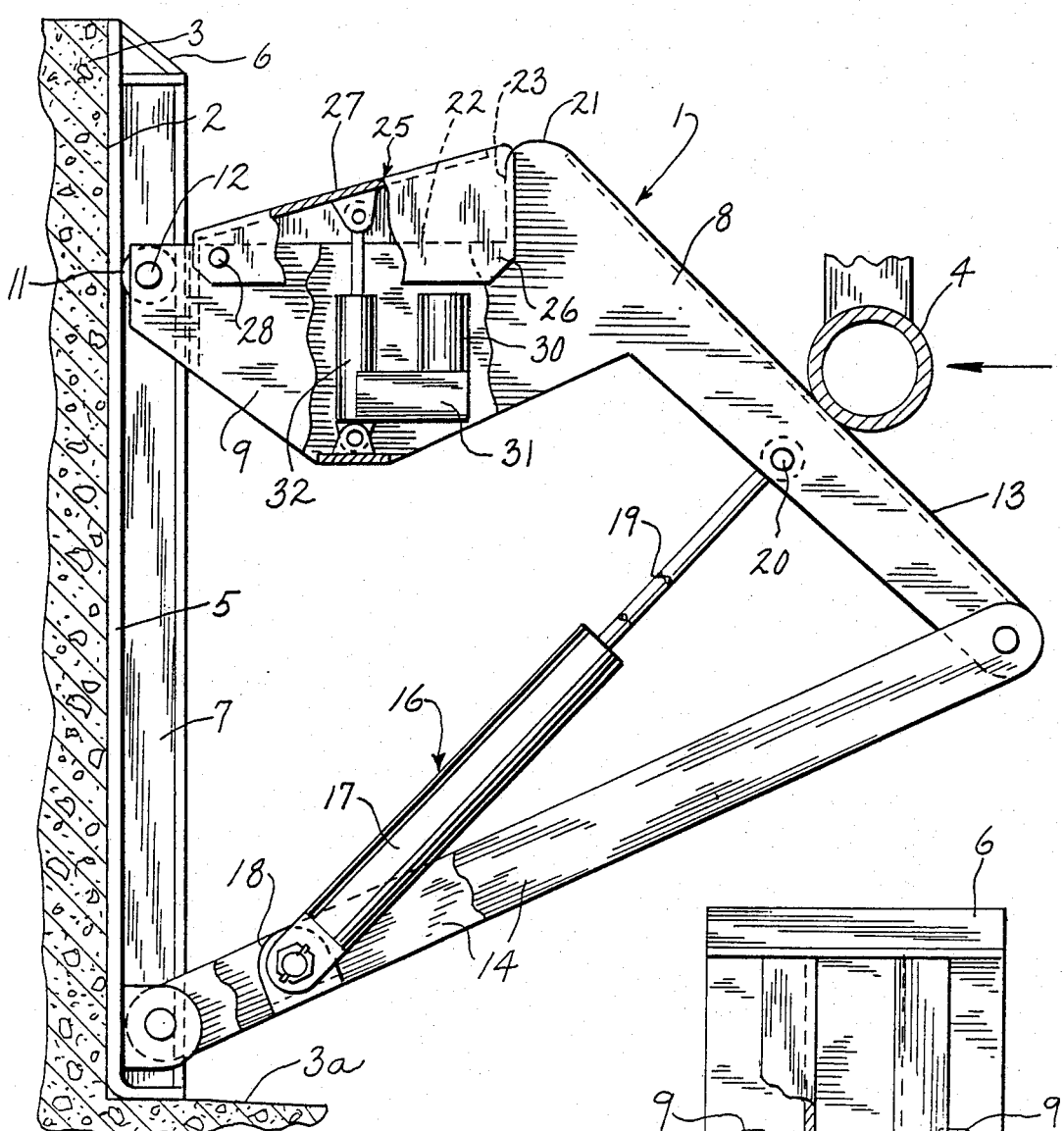
FIG. 1 is a side elevation of the vehicle restraint of the invention with parts broken away in section and showing the vehicle restraint in the upper storage position.
Figure 4:
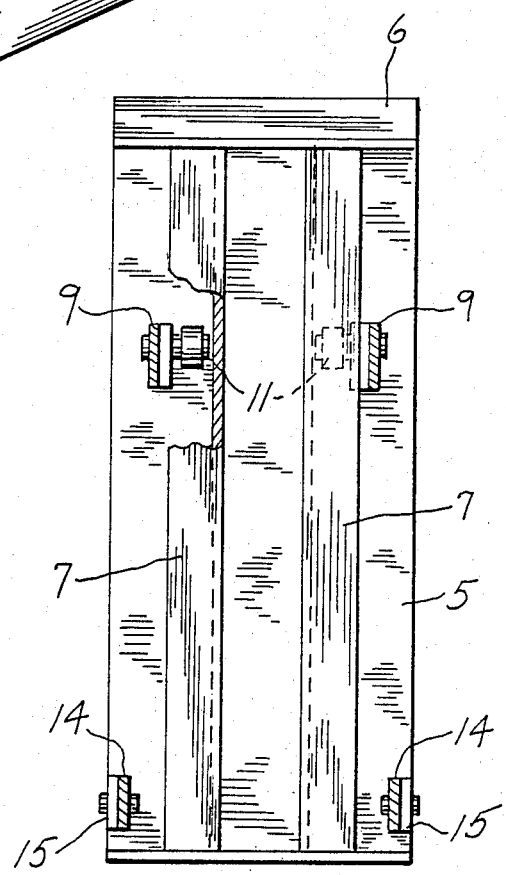
FIG. 4 is a section taken along line 4—4 of FIG. 2.

The drawings illustrate a vehicle restraint 1 mounted on the front face 2 of a loading dock 3 and adapted to engage an ICC bar 4 mounted at the rear end of a truck to prevent the truck from accidentally pulling away from the loading dock while a loading operation is in progress. The ICC bar 4 is a horizontal bar being located at the rear of the truck beneath the truck bed and acts to prevent an automobile from under-riding the truck in the event of a rear end collision. The cross sectional configuration, as well as the height of the ICC bar above the ground, may vary within prescribed limits.

The loading dock 3 may also include a dock leveler, not shown, which is adapted to bridge the gap between the upper surface of the loading dock and the truck bed to enable material handling equipment to move between the dock and the truck bed.

Vehicle restraint 1 includes a mounting plate 5, which is secured to the front face 2 of dock 3 through a series of standard anchor bolts, not shown. An angular weldment 6 is secured to the upper edge of plate 5.

Figure 2:
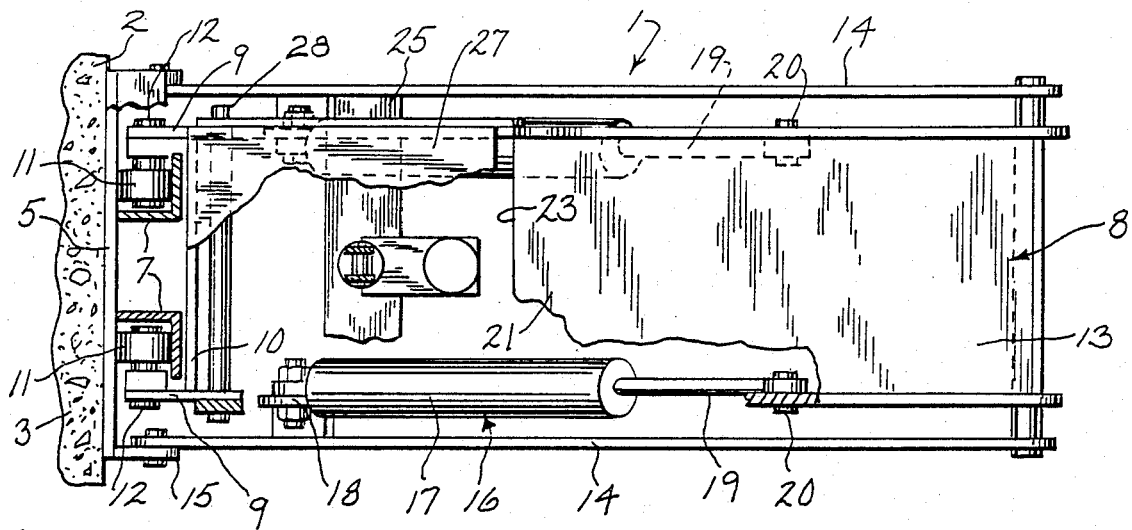
FIG. 2 is a top plan view of the vehicle restraint with parts broken away in section.

Secured to plate 5 is a pair of angle-shaped, vertical guide tracks 7, and a slide or carriage 8 is mounted for vertical movement on tracks 7. Carriage 8 includes a pair of side plates 9 which are connected by a cross plate 10. As best shown in FIG. 2, the inner ends of side plates 9 project inwardly toward dock 3 from cross plate 10 and a roller 11 is journalled on the projecting end of each plate 9 through roller shafts 12, and rollers 11 ride on tracks 7. Shafts 12 are axially aligned.

Slide 8 is provided with an inclined outer surface 13 which slopes downwardly and outwardly and the lower end of surface 13 is located a substantial distance beneath the axes of roller shafts 12. In practice the lower end of surface 13 is located beneath the vertical midpoint between the driveway 3a and the axes of shafts 12 when the vehicle restraint is in the upper storage position.

A pair of links or arms 14 of fixed length pivotally interconnect the lower end of slide 8 with lugs 15 that extend outwardly from the lower end of mounting plate 5.

Slide 8 is biased to an upper storage position with respect to mounting plate 5 by a pair of gas spring units 16. Each gas spring unit includes a cylinder 17 containing a compressible gas and the lower end of each cylinder is pivotally connected through lugs 18 to the respective arms 14. A piston is slidable in each cylinder 17 and a piston rod 19 extends outwardly from the upper end of each cylinder and is pivotally connected through pins 20 to the respective sides of the inclined surface 13 of slide 8. Gas spring units 16 are of a conventional type and serve to urge the slide 8 upwardly to the storage position. It is contemplated that other types of resilient biasing members can be utilized to bias the slide to an upper storage position.

Figure 3:
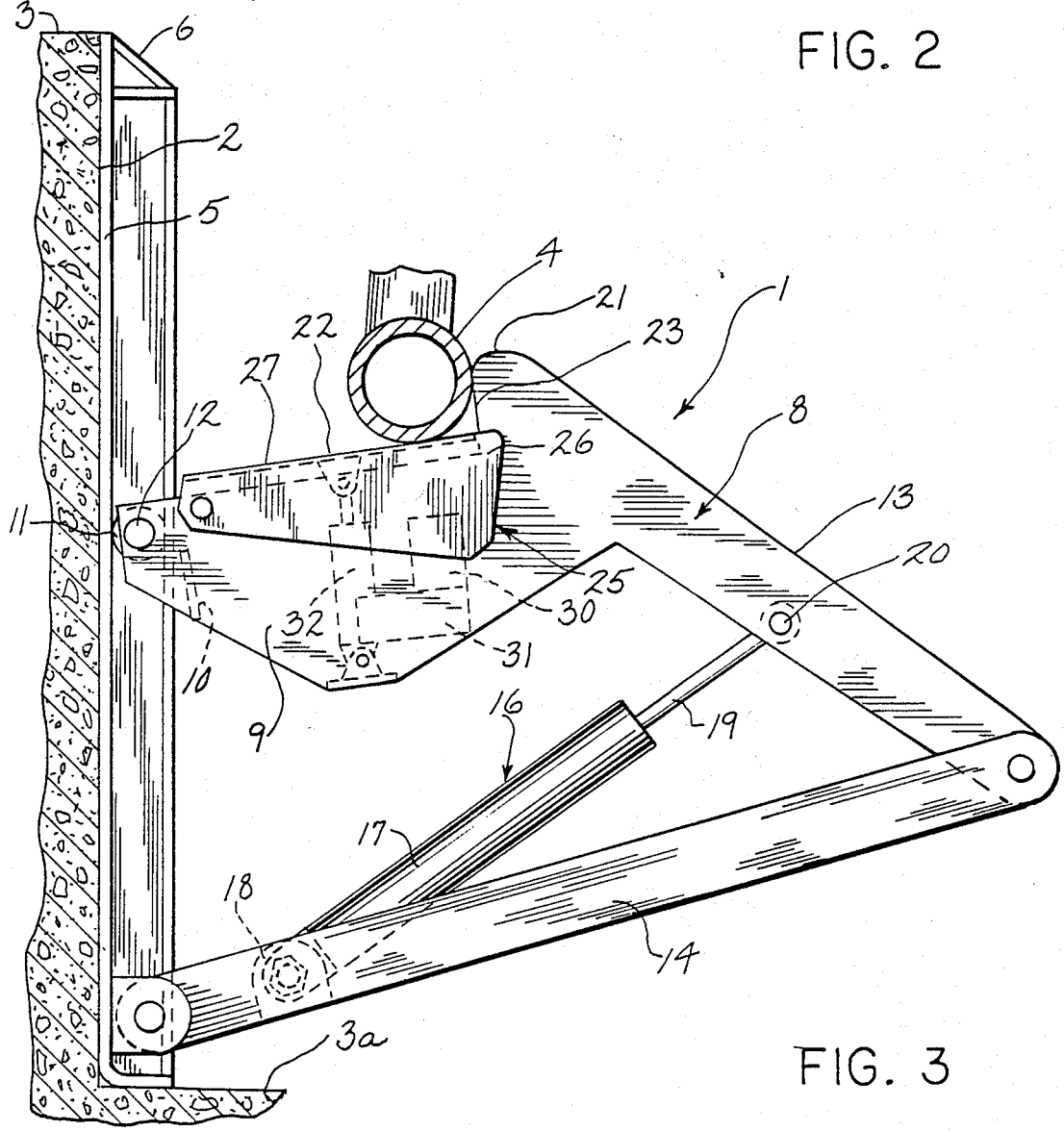
FIG. 3 is a view similar to FIG. 1 showing the vehicle restraint in the operative position.

As the truck backs toward the loading dock 3, the ICC bar 4 will engage the inclined surface 13, wedging the slide 8 downwardly against the force of the gas spring assemblies 16 and simultaneously decreasing the angularity of surface 13 with respect to the horizontal. Continued movement of the truck toward the loading dock will wedge the slide 8 down to a position where the ICC bar will ride over the upper tip 21 of the slide and onto the upper surface of a release member 25. Release member 25 is composed of a pair of spaced vertical side plates 26 which are connected by a top plate 27. The inner end of release member 25 is pivotally connected to the upper portion of slide 8 by a horizontal pivot shaft 28, and the release member is mounted for pivotal movement relative to a notch or recess 22 in the upper surface of slide 8 from an upper inclined release position, as shown in FIG. 1, to a lower generally horizontal hitch position, as shown in FIG. 3. Notch 22 is bordered by a vertical surface 23.

After the truck has backed to the dock and ICC bar 4 has wedged slide 8 downwardly and has ridden over top 21, release member 25 is pivoted downwardly and gas spring assemblies 16 will simultaneously urge the upper surface of the slide 8 into engagement with ICC bar 4 and the vertical surface 23 of notch 22 will thus prevent the ICC bar and truck from moving outwardly from the dock. A suitable sensing system, not shown, can be included which is actuated by downward pivotal movement of release member 25 to provide a signal on the loading dock indicating that the vehicle restraint is hitched with the ICC bar.

The release member 25 is power operated between the upper release position and the lower hitch position. In this regard, a motor 30 and gear box 31 are mounted on slide 8 and the output shaft of the gear box drives a conventional linear actuator 32, which is operably connected to the lower surface of release member 25. Operation of motor 30 in one direction will drive the actuator 32 downwardly to lower release member 25, to enable notch 22 to be biased into engagement with ICC bar 4. Operation of motor 30 in the opposite direction will drive actuator 32 upwardly elevating release member 25 and causing an upward force to be exerted through member 25 against ICC bar 4. As the ICC bar cannot move upwardly, a reactive force is exerted downwardly against slide 8, causing the slide to move downwardly against the force of gas spring assemblies 16. With this action, the ICC bar is disengaged from notch 22. As the release member 25 at this time is locked against downward movement by the linear actuator 32, the truck can pull away from the dock, wedging the release bar 25 and slide 8 downwardly, as the ICC bar passes over the upper tip 21 of slide 8.

The gas spring assemblies 16 also enable the vehicle restraint to follow vertical float of the ICC bar and truck during a loading operation. For example, as a load is applied to the truck bed, the truck bed and ICC bar 4 will move downwardly and this action will compress the gas spring assemblies 16. Conversely, if a load is removed from the truck bed, the ICC bar 4 will move upwardly relative to the dock and the gas spring assemblies will extend to follow the upward movement. Thus, the gas spring assemblies 16 serve to accommodate vertical float of the truck bed during the loading operation.

The vehicle restraint of the invention incorporates only a single set of guide rollers 11 and this eliminates any possibility of the rollers or slide jamming on the guide tracks 7 during vertical movement of the slide, as can occur with vehicle restraints incorporating multiple roller sets. Moreover, the use of a single set of rollers reduces the vertical depth of the slide, enabling the slide to move to a lower position and increasing the range of operability of the vehicle restraint.

As the force applied through the ICC bar 4 to the inclined surface 13 is partially carried by the arms 14, the stress on the rollers 11 is reduced, thereby enabling rollers and bearings of lesser capacity to be utilized.

Due to the pivotal connection between the inner end of slide 8 and the mounting plate 5, the angularity of surface 13 is progressively decreased relative to the horizontal as the ICC bar engages the surface 13 and moves toward the loading dock 3. As the angularity decreases, the horizontal force required to drive the slide down correspondingly decreases, thus reducing the stress applied to the slide and the guide system.

Various modes of carrying out the invention are contemplated as being within the scope of the following claims particularly pointing out and distinctly claiming the subject matter which is regarded as the invention.

I claim:

1. A vehicle restraint, comprising a frame mounted on a supporting structure, a slide having an inner end and having an upper surface, guide means for mounting the said inner end of said slide for vertical movement on said frame, said guide means comprising a single pair of guide members mounted co-axially on said slide about a horizontal axis, recess means disposed in said upper surface of said slide, said slide having a downwardly and outwardly facing inclined surface with said inclined surface having an upper end and having a lower end disposed at a level substantially beneath the level of said axis, biasing means for urging the slide to an upper storage position, an abutment on a vehicle backing toward said supporting structure disposed to engage said inclined surface to wedge said slide downwardly against the force of said biasing means and effect engagement of said abutment with said recess means to thereby prevent said vehicle from pulling away from said supporting structure, said slide being constructed and arranged to pivot upwardly about said axis as said slide is wedged downwardly, and release means for releasing said abutment means from said recess means to enable said vehicle to pull away from the supporting structure.

2. The vehicle restraint of claim 1, wherein said guide members comprise rollers.

3. The vehicle restraint of claim 1, wherein said recess means is bordered by a generally vertical locking surface disposed outwardly of said recess means.

4. The vehicle restraint of claim 1, wherein said supporting structure comprises a loading dock extending upwardly from a driveway and the lower end of said inclined surface is located beneath the vertical midpoint between the driveway and said axis when said vehicle restraint is in the upper storage position.

5. The vehicle restraint of claim 1, and including a link interconnecting the lower end of said inclined surface and the lower portion of said frame.

6. The vehicle restraint of claim 5, wherein said link has a fixed length.

7. The vehicle restraint of claim 1, wherein said release means comprises a release member mounted in said recess means for movement between a lower position and an upper position, and actuating means for moving said release member from said lower position toward said upper position, movement of said release member toward said upper position creating an upward force against said abutment and a resulting downward force against said slide to move said slide downwardly and cause release of said abutment from said recess means.

8. The vehicle restraint of claim 5, wherein said biasing means comprises a resilient member interconnecting said link and said slide.

9. The vehicle restraint of claim 8, wherein said resilient member comprises a gas spring.

10. A vehicle restraint, comprising a frame mounted on a supporting structure, a slide having an inner end and having an upper surface, said slide also having an outwardly facing inclined surface extending downwardly and outwardly from said upper surface, pivotal means for mounting the inner end of the slide for pivotal movement relative to said frame, guide means for mounting the inner end of the slide for vertical movement on said frame, recess means disposed in the upper surface of said slide, biasing means for urging the slide to an upper storage position, an abutment of a vehicle backing toward said supporting structure disposed to engage said inclined outer surface to wedge said slide downwardly against the force of said biasing means and effect engagement of said abutment with said recess means to thereby prevent said vehicle from pulling away from said supporting structure, said slide being constructed and arranged to pivot upwardly about said pivotal means as the slide is wedged downwardly, and release means for releasing said abutment from said recess means to enable said vehicle to pull away from said supporting structure.

11. The vehicle restraint of claim 10, wherein said slide is a one-piece structure, extending from said inner end to the lower end of said inclined outwardly facing surface.

12. The vehicle restraint of claim 10, wherein said pivotal means comprises a single set of rollers mounted on said inner end and engaged with said guide, said rollers having aligned horizontal axes.

13. The vehicle restraint of claim 10, and including means for preventing downward pivotal movement of said slide relative to said frame when the slide is contacted by said abutment.

14. A vehicle restraint, comprising a frame mounted on a supporting structure, a slide having an inner end and having a downwardly and outwardly facing inclined surface, guide means for mounting the said inner end of said slide for vertical movement on said frame, biasing means for urging the slide to an upper storage position, and means responsive to an external force being applied to said inclined surface for wedging said slide downwardly relative to said guide means to an operative position and simultaneously pivoting said slide upwardly relative to said frame to progressively decrease the angularity of said inclined surface to the horizontal, and restraining means carried by the slide for blocking outward movement of a vehicle disposed adjacent said supporting structure when said slide is in the operative position.

* * * * *